US012737336B2

(12) United States Patent
Deshmukh et al.

(10) Patent No.: US 12,737,336 B2
(45) Date of Patent: Sep. 15, 2026

(54) METHOD AND SYSTEM FOR CREATING A MULTIMODAL AND MULTILINGUAL PRODUCT CATALOGUE USING A HYBRID MODEL

(71) Applicant: LTI Mindtree Ltd, Mumbai (IN)

(72) Inventors: Vaishali Mahesh Deshmukh, Mumbai (IN); Ganesan T, Mumbai (IN); Gnanasudha K, Mumbai (IN); Tamilselvan E., Mumbai (IN); Akshay Rakesh Toshniwal, Mumbai (IN); Avula Benzamin, Mumbai (IN); Naveen Kumaar Subramanian, Mumbai (IN); Jai Goutham V, Mumbai (IN); Gurumoorthy Srinivasan, Mumbai (IN)

(73) Assignee: LTI Mindtree Ltd., Mumbai (IN)

( * ) Notice: Subject to any disclaimer, the term of this patent is extended or adjusted under 35 U.S.C. 154(b) by 0 days.

(21) Appl. No.: 19/169,038

(22) Filed: Apr. 3, 2025

(65) Prior Publication Data

US 2026/0064648 A1 Mar. 5, 2026

(51) Int. Cl.

| | |
|---|---|
| ***G06F 16/22*** | (2019.01) |
| ***G06F 40/295*** | (2020.01) |
| ***G06Q 10/087*** | (2023.01) |
| ***G06Q 30/0601*** | (2023.01) |

(52) U.S. Cl.

CPC ........ *G06F 16/2237* (2019.01); *G06F 40/295* (2020.01); *G06Q 10/087* (2013.01); *G06Q 30/0603* (2013.01)

(58) Field of Classification Search

CPC . G06F 16/2237; G06F 40/295; G06Q 10/087; G06Q 30/0603

USPC ........................................................ 707/741

See application file for complete search history.

(56) References Cited

U.S. PATENT DOCUMENTS

2011/0270816 A1* 11/2011 Gossel .................. G06F 16/951 707/706
2015/0161693 A1* 6/2015 Yalamanchi ........ G06F 12/0646 705/26.1
2020/0082468 A1* 3/2020 Grove ..................... G06Q 30/06
2024/0386015 A1* 11/2024 Crabtree ............. G06F 16/9024
2025/0080582 A1* 3/2025 Budukh .............. H04L 41/0627
2025/0133045 A1* 4/2025 Kieffer .................... H04L 51/10
2025/0259144 A1* 8/2025 Crabtree ............ G06Q 30/0601

* cited by examiner

*Primary Examiner* — Cam Y T Truong
(74) *Attorney, Agent, or Firm* — CHIP LAW GROUP

(57) ABSTRACT

Disclosed is a method and system for creating a product catalogue using a hybrid model. A data reception module receives multimodal data related to a product from one or more data sources that may include structured, unstructured, and semi-structured data. An extraction module extracts text from the product data and is then preprocessed using a preprocessing module, which is further converted into numerical vectors. The hybrid model, an integration of a rule-based model, a Named Entity Recognition (NER) model, and a Generative-AI model, is contextually employed to extract multilingual attributes and values from the text. An attribute-value module generates one or more attribute-value pairs and maps them to the product in a structured format. Finally, a catalogue creation module creates a product catalogue using the one or more attribute-value pairs.

13 Claims, 3 Drawing Sheets

METHOD AND SYSTEM FOR CREATING A MULTIMODAL AND MULTILINGUAL PRODUCT CATALOGUE USING A HYBRID MODEL

CROSS REFERENCE TO RELATED APPLICATIONS

This application claims the benefit of and priority to Indian patent application Ser. No. 202421066125, filed on Sep. 2, 2024, which is hereby incorporated herein by reference in its entirety. Each of the above-referenced applications is hereby incorporated herein by reference in its entirety.

FIELD

Various embodiments of the present disclosure generally relate to a product catalogue. More particularly, the disclosure relates to a method and system for creating a product catalogue using a hybrid model approach for multimodal and multilingual product attribute extraction and mapping.

BACKGROUND

In today's rapidly evolving e-commerce landscape, an accurate and comprehensive presentation of product information is critical to driving sales and ensuring customer satisfaction. Product catalogs serve as pivotal tools in achieving these objectives by structuring and organizing product data in a way that is accessible and informative to consumers.

Product catalogs provide a centralized repository where customers can explore and compare products based on various attributes such as size, color, features, and price. By presenting this information in a structured format, catalogs facilitate informed purchasing decisions, enhance user experience, and build trust between consumers and retailers.

A basic challenge in product catalog creation lies in accurately mapping product attributes to their corresponding values. This process becomes particularly daunting when dealing with large volumes of unstructured product data sourced from diverse suppliers or platforms. Traditional methods rely heavily on manual rules or keyword matching, which are labor-intensive, error-prone, and lack scalability. These methods often struggle to keep pace with the dynamic nature of e-commerce, where product information is constantly updated and expanded.

Traditional methods for attribute-value mapping often involve manual rules or keyword matching, which are not only labor-intensive but also prone to errors and lack scalability.

Furthermore, the complexities of product catalog creation are amplified when handling data available in multiple languages. E-commerce platforms operate on a global scale, catering to diverse linguistic demographics. Existing methods for attribute-value mapping and catalog management face significant hurdles in accurately translating and interpreting product attributes across different languages. This challenge not only impacts data consistency and accuracy but also hinders the ability to effectively target and engage international markets.

Currently, several solutions rely solely on individual methods such as rule-based approaches, supervised machine learning approach, semi-supervised methods, named entity recognition (NER) methods, deep learning models, and large language models (LLMs). Each of these models has its own strengths and limitations in extracting attributes and their corresponding values from the web and accurately mapping them to specific products. However, none of these models can effectively handle the diverse types of data formats found on the web. This presents a significant challenge, especially when dealing with product data that varies in orientation and modality.

While rule-based approaches offer transparency, control, and domain-specific customization, they may struggle with flexibility, scalability, and handling complex data patterns. Supervised methods require a large amount of labeled data for training. Creating labeled datasets for product attribute mapping can be time-consuming and expensive, especially for fine-grained attribute mapping. Product descriptions can vary significantly in terms of language, structure, and formatting. Supervised models may struggle to accurately extract attributes and values from diverse text formats, leading to reduced performance.

Unsupervised clustering algorithms may group together attributes and values that are semantically similar but not identical. This can result in ambiguity in the attribute mapping, leading to incorrect results. The performance of semi-supervised methods heavily depends on the quality and representativeness of the labeled data. If the labeled data is noisy or biased, it can negatively impact the performance of the model.

Deep learning models require large amounts of labeled data for training. Building labeled datasets for product attribute mapping can be time-consuming and expensive, especially for fine-grained attribute mapping. Deep learning models are often complex and difficult to interpret. Understanding why a model makes a particular prediction for attribute mapping can be challenging, especially in cases where errors occur.

While large language models can generate coherent text based on context, they may not fully understand the context of product descriptions and may struggle to accurately extract attributes and values. Large language models generate text based on learned patterns in the data, but they lack explicit control over attribute mapping tasks. Additionally, they may not provide detailed explanations for their predictions, making it difficult to understand why a particular mapping was made.

Therefore, there exists a need for a unified framework that can accurately extract attributes and values from distinct types, languages, and modalities of product data including unstructured and semi-structured data, and accurately map the generated attribute-value pairs to the product.

SUMMARY

The present disclosure relates to a method and system for creating a multimodal and multilingual product catalogue using a hybrid model. A data reception module receives multimodal data related to a product from one or more data sources that may include structured, unstructured, and semi-structured data. An extraction module then extracts text from the received product data using one or more extraction techniques. The extracted text is then preprocessed using a preprocessing module, which is further converted into numerical vectors using Term Frequency-Inverse Document Frequency (TF-IDF) mechanism.

In response to the determined type of data, the hybrid model is contextually employed to extract multilingual attributes and values from the text. The hybrid model is an integration of a rule-based model, a Named Entity Recognition (NER) model, and a Generative-AI model.

The rules-based model extracts one or more attributes and one or more values from the data related to the product based on predefined structures, patterns, and regular expressions in the data. The NER model extracts one or more attributes and one or more attributes and one or more values from unstructured text of the data related to the product. The Gen-AI model generates new or missing context-dependent values for one or more attributes based on description of the data related to the product.

An attribute-value module then generates one or more attribute-value pairs and maps the one or more attribute-value pairs to the product in a structured format. Finally, a catalogue creation module creates a product catalogue using the one or more attribute-value pairs, which define the features, specifications, and details of each product.

DETAILED DESCRIPTION

Pursuant to various embodiments, the present disclosure provides a method and system for creating a multimodal and multilingual product catalogue using a hybrid model. A data reception module receives multimodal data related to a product from one or more data sources that may include structured, unstructured, and semi-structured data. An extraction module then extracts text from the received product data using one or more extraction techniques. The extracted text is then preprocessed using a preprocessing module, which is further converted into numerical vectors using Term Frequency-Inverse Document Frequency (TF-IDF) mechanism. In response to the determined type of data, the hybrid model is contextually employed to extract multilingual attributes and values from the text. The hybrid model is an integration of a rule-based model, a Named Entity Recognition (NER) model, and a Generative-AI model. The rules-based model extracts one or more attributes and one or more values from the data related to the product based on predefined structures, patterns, and regular expressions in the data. The NER model extracts one or more attributes and one or more attributes and one or more values from unstructured text of the data related to the product. The Gen-AI model generates new or missing context-dependent values for one or more attributes based on description of the data related to the product. An attribute-value module then generates one or more attribute-value pairs and maps the one or more attribute-value pairs to the product in a structured format. Finally, a catalogue creation module creates a product catalogue using the one or more attribute-value pairs, which define the features, specifications, and details of each product.

Figure 1:
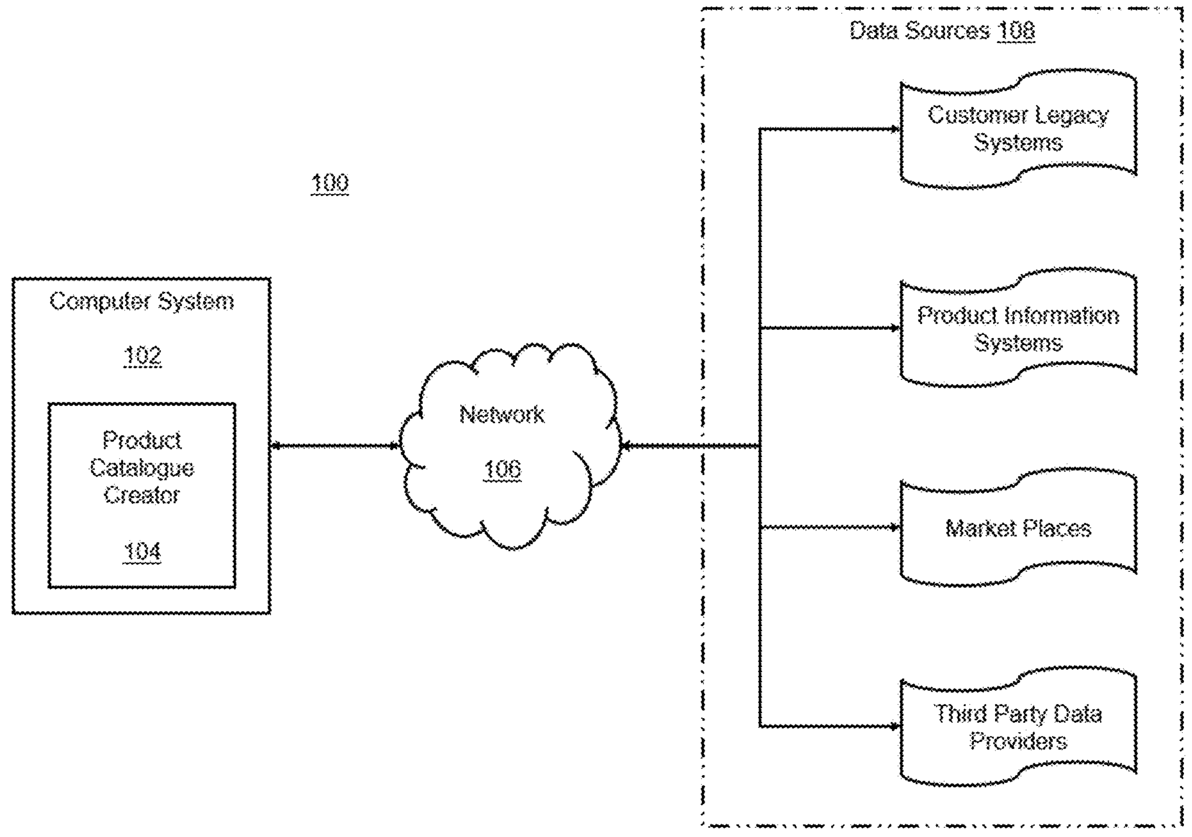
FIG. 1 is a diagram that illustrates an exemplary environment within which various embodiments of the present disclosure may function.

FIG. 1 is a diagram that illustrates an exemplary environment 100 within which various embodiments of the present disclosure may function. Referring to FIG. 1, the environment 100 comprises a computer system 102, a product catalogue creator 104, a network 106, and one or more data sources 108.

The computer system 102 may comprise any computing device such as a desktop, server computer, laptop, tablet, mobile device, mobile phone, digital signal processor (DSP), microcontroller, microcomputer, multi-processor, smart device, voice assistant, smart watch, or any other computer. The computer system 102 may comprise the product catalogue creator 104, which may be a software program stored as instructions on computer-readable media and executable by a processor of the computer system 102.

Although the computer system 102 is illustrated as a single device, it should be understood that they may comprise a plurality of networked devices, such as networked computer systems or networked servers. For example, the networked computer systems may operate as a load balanced array or pool of computer systems.

In one or more embodiments, the product catalogue creator 104 may comprise software to analyze data therein to generate a structured database of product data. The product catalogue creator 104 is developed by encompassing a hybrid model which is an integration of one or more models such as, for instance, a rule-based model, a named-entity recognition (NER) model, and a Gen-AI model. The hybrid model disclosed herein is continuously improved through a feedback mechanism.

In some non-limiting embodiments, the hybrid model described herein is implemented using a combination of three models such as, a rule-based model, a NER model, and a Gen-AI model. It should be understood that this combination is illustrative and not limiting. The hybrid model can incorporate any combination of models, including but not limited to those explicitly described here. Different combinations of models may be used depending on the specific application, data characteristics, or performance requirements without departing from the scope of the disclosure.

The product catalogue creator 104 identifies relevant product attributes defined by retailers or domain experts in multiple languages such as, but not limited to, product type, brand, product features, product overview, product application, product specification, size, material, length, and product name from unstructured data and semi-structured data.

The product catalogue creator 104 extracts corresponding values for each given attribute such as, but not limited to, numerical values, units, and qualitative descriptions.

By facilitating the advantage in employing the one or more models together in a hybrid approach, the product catalogue creator 104 gets trained in a robust and accurate manner for extracting multilingual attributes and values and thereby generating attribute-value pairs. The hybrid approach integrates diverse methodologies to optimize attribute extraction across multilingual datasets.

In an exemplary embodiment, the models may leverage machine learning (ML) techniques to understand contextual variations and cultural preferences, ensuring that attribute-value pairs reflect accurate and culturally sensitive product attributes.

The hybrid approach based training facilitates the product catalogue creator 104 to adapt dynamically to evolving linguistic patterns and user requirements. Continuous learning and optimization refine the ability of the product catalogue creator 104 to handle multilingual attributes and values with precision, improving the accuracy and relevance of attribute-value pairs generated.

In one or more embodiments, the product catalogue creator 104 facilitates application of the extracted attribute-value pairs in various cross-domain applications such as, but not limited to, e-commerce platforms, supply chain management, and market analysis.

In an exemplary embodiment, the attribute-value pairs extracted by the product catalogue creator 104 enrich product listings on e-commerce platforms with detailed and structured information. Each attribute-value pair provides essential product details such as dimensions, colors, materials, and specifications in a standardized format. This enhances searchability, enables faceted navigation, and improves product recommendations, thereby enhancing the overall user experience and increasing conversion rates.

In another exemplary embodiment, in supply chain management, accurate and comprehensive attribute-value pairs are vital for inventory management, procurement, and logistics. By incorporating precise data on product attributes, including quantities, dimensions, and material compositions, the product catalogue creator 104 optimizes inventory levels, streamlines procurement processes, and ensures efficient handling and transportation of goods. Real-time updates and insights derived from attribute-value pairs facilitate demand forecasting and inventory optimization, minimizing costs and enhancing operational efficiency.

In yet another exemplary embodiment, the attribute-value pairs extends beyond individual applications, fostering cross-domain integration and collaboration. Integrated data from product catalogues facilitates seamless information exchange between e-commerce platforms, suppliers, and analytics tools.

In yet another exemplary embodiment, attribute-value pairs serve as valuable inputs for market analysis and business intelligence. By aggregating and analyzing product attributes across a wide range of offerings, businesses gain insights into market trends, consumer preferences, and competitive landscapes. Detailed attribute data enables businesses to identify emerging opportunities, optimize pricing strategies, and tailor marketing campaigns based on granular product characteristics and customer preferences.

The network 106 includes communication networks operable to facilitate communication, either wirelessly or wired. The network 106 connects a plurality of computer systems. The network 106 may comprise, for example, an intranet, local area network, wide area network, the internet, public switched telephone network (PSTN), network of networks, or other network. The plurality of computer systems on the network 106 may transmit and receive data with other computer systems.

The product catalogue creator 104 is connected to the one or more data sources 108 via the network 106. The one or more data sources 108 can be such as, but not limited to, customer legacy systems, information systems, marketplaces, and third party providers. The product catalogue creator 104 gathers information for products that may comprise different types of data such as, unstructured data and semi-structured data from the one or more data sources 108.

In one or more embodiments, the product catalogue creator 104 may use one or more Application programming Interfaces (APIs) to gather product information from the one or more data sources 108 such as, for example, from product information management (PIM) systems. The APIs enable the product catalogue creator 104 to interact with other systems and retrieve data. The APIs act as intermediaries that facilitate data exchange and integration between different software systems.

Figure 2:
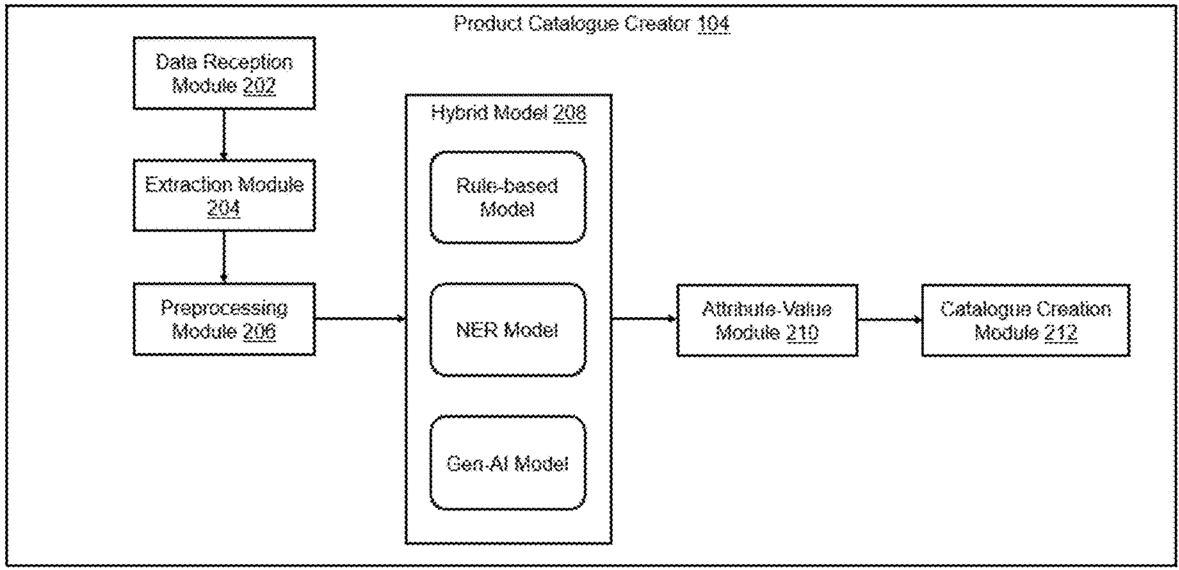
FIG. 2 is a diagram that illustrates a product catalogue creator for creating a product catalogue using a hybrid model, in accordance with an embodiment of the disclosure.

FIG. 2 is a diagram that illustrates a product catalogue creator 104 for creating a product catalogue using a hybrid model 208, in accordance with an embodiment of the disclosure. Referring to FIG. 2, the product catalogue creator 104 comprises a data reception module 202, an extraction module 204, the hybrid model 208, an attribute-value module 210, and a catalogue creation module 212.

In one or more embodiments, the data reception module 202 may comprise suitable logic, interfaces, and/or code that may be configured to receive data related to products from the one or more data sources 108 that may include unstructured data and semi-structured data. For example, unstructured data refers to information that does not have a predefined format or structure, such as, for example, free-form text, emails, and social media posts. Semi-structured data, on the other hand, has some organizational properties that make it easier to analyze, but does not fit neatly into a traditional relational database schema. Examples may include XML files, JSON documents, and certain types of log files.

In one or more embodiments, the data reception module 202 may use one or more APIs to gather product information from the one or more data sources 108 such as, for example, from product information management (PIM) systems. The one or more APIs serve as a bridge between the data reception module 202 and the one or more data sources 108, facilitating seamless communication and data exchange.

When the data reception module 202 is configured to interact with a data source from the one or more data source 108 via an API, it sends requests to the API endpoints provided by that source. The requests can be tailored to retrieve specific types of product information, such as details about product specifications, pricing, availability, and reviews. APIs typically offer various methods, such as GET, POST, PUT, and DELETE, to perform different operations and retrieve or manipulate data.

In one or more embodiments, the data reception module 202 receives data from the one or more data sources 108 with different modalities and different orientations such as, for example, text, images, videos, audios, etc.

In an exemplary embodiment, textual data received by the data reception module 202 includes structured information such as product descriptions, specifications, and reviews. Image data comprises visual representations of products, captured from different angles and under varying lighting conditions. The data reception module 202 processes image data to extract visual attributes such as color, shape, pattern, and texture. Video data provides dynamic content showcasing products in action or detailed demonstrations. The data reception module 202 extracts temporal attributes, identifies key frames, and analyzes visual and auditory cues within videos. Audio data includes spoken descriptions, product reviews, or customer feedback captured in audio format. The data reception module 202 utilizes speech recognition technology to transcribe audio content into text, enabling further analysis and integration with other data modalities.

In one or more embodiments, the extraction module 204 may comprise suitable logic, interfaces, and/or code that may be configured to extract text from the data related to the product. In some implementations, the extraction module 204 may use techniques such as, text parsing, optical character recognition (OCR), natural language extraction for extraction of text from the data received by the data reception module 202.

It should be understood that the extraction module 204 is not restricted to the specific techniques mentioned herein. Other extraction techniques, such as machine learning algorithms for entity recognition, sentiment analysis, or deep learning models for image and video processing, may also be utilized depending on the nature of the data and the specific requirements of the application.

In one or more embodiments, the preprocessing module 206 may comprise suitable logic, interfaces, and/or code that may be configured to clean and preprocess the extracted text by removing noise, special characters, and HTML tags. Cleaning the text involves removing unwanted or irrelevant parts of that could interfere with analysis or processing, which often includes removing noise, removing special characters, and removing HTML tags. Noise in the extracted text may refer to irrelevant or meaningless data, such as random characters, symbols, or artifacts from the extraction process that are not part of the actual text content. Special characters may refer to punctuation marks, mathematical symbols, or other non-alphanumeric characters that may not contribute to the analysis or could disrupt processing algorithms.

In some non-limiting embodiments, if the text extracted by the extraction module 204 is from web pages or HTML documents, it may contain HTML tags (e.g., <div>, <p>, <a>) which are not part of the textual content itself. Removing these tags ensures that only the plain text is considered for further analysis.

The preprocessing module 206 tokenizes and performs lemmatization and part-of-speech tagged on the extracted text to normalize them further. The normalized text is then converted into numerical vectors using techniques like Term Frequency-Inverse Document Frequency (TF-IDF).

TF-IDF is a statistical measure used to evaluate the importance of a word in the text relative to a collection of words in documents (corpus). TF measures how frequently a term (word) appears in a document. It's calculated as the ratio of the number of times a word appears in a document compared to the total number of words in that document. IDF measures how important a term is across the entire corpus. Terms that are common across all documents are penalized in terms of their importance, while terms that are rare are given more weight. IDF is calculated as the logarithm of the ratio of the total number of documents to the number of documents containing the term.

In one or more embodiments, the hybrid model 208 of the product catalogue generator 104 is built by combining the rule-based model, the NER model, and the Gen-AI model. The hybrid model 208 is contextually employed based on the type of data that is received by the data reception module 202. Based on the type of data that is determined, the product catalogue creator 104 deploys a suitable model from the rule-based, NER, and Gen-AI models of the hybrid model 208.

In some embodiments, the hybrid model 208 is designed with a modular architecture where each component of the rule-based model, the NER model, and the Gen-AI model is responsible for one or more tasks. For example, a pipeline manager which comprise suitable logic, interfaces, and/or code may be configured to route attributes from the received data to an appropriate module based on a predefined criterion.

In an exemplary embodiment, the choice of which model to employ from the hybrid model 208 depends on the characteristics and requirements of the received data along with pre-defined attributes provided by a business.

In accordance with the exemplary embodiment, if the data can be effectively categorized and processed using predefined rules and conditions, the rule-based model is deployed to extract one or more attributes and one or more values from the text of the product data. The rule-based model of the hybrid model 208 is designed by using domain specific rules and patterns, and is configured to extract the one or more attributes and the one or more values based on known structures and patterns in the text data.

For instance, the one or more attributes of a product can be such as, for example, dimensions, material, color, capacity, power rating, performance specifications, compatibility, warranty, etc. The one or more values can be such as, for example, dimensions such as inches, material such as leather, color such as black, power rating such as 1200 watts, performance such as 4K resolution, compatibility such as Windows OS, warranty such as 2 years, etc.

In accordance with the exemplary embodiment, if the data received is determined to be unstructured and semi-structured data, the NER model is deployed to identify and extract the one or more attributes and the one or more values of the product. The NER model is a type of natural language processing (NLP) model that identifies and categorizes entities within text data. Text data that lacks a predefined format or organization, such as product descriptions from various sources like customer reviews or social media comments is determined to be unstructured data. Data that has some organization but may not fit neatly into a relational database format, such as data from spreadsheets or loosely structured data tables is determined to be semi-structured data. The NER model processes the textual data to identify product names, extract product attributes, and capture attribute values.

In accordance with the exemplary embodiment, if a portion of content is determined to be missing in the received text, the Gen-AI model is deployed to generate new content, or responses based on patterns and examples seen during training.

For instance, the process begins with identifying parts of the text that are incomplete or missing essential information. This could happen due to various reasons such as data corruption, incomplete submissions, or data extraction errors. Upon detecting the missing gaps, the Generative AI (Gen-AI) model of the hybrid model 208 is deployed by the product catalogue creator 104. Accordingly, the Gen-AI model creates new content based on its understanding of language patterns and structures derived from its training data.

The Gen-AI model doesn't create content randomly. Instead, it utilizes the knowledge it gained during training from large datasets. This training enables it to recognize patterns in text and understand how to generate coherent and contextually appropriate responses.

In some non-limiting embodiments, the Gen-AI models are trained on large datasets containing examples of text. They learn to recognize patterns and relationships within the text data. When deployed, the Gen-AI model can be used to fill in missing parts of text by generating plausible content that fits with the context and style of the existing text.

By dynamically selecting the appropriate model, the product catalogue generator 104 can optimize its performance based on the specific requirements of the data it receives.

In one or more embodiments, the hybrid model 208 utilizes techniques such as web crawling and web scraping techniques to extract the one or more attributes and the corresponding one or more values of the product. The hybrid model 208 may initiate web crawling processes to navigate through web pages, following hyperlinks and exploring interconnected pages across the internet. This method enables comprehensive data gathering from diverse sources, including e-commerce platforms, manufacturer websites, and product review sites. On other hand, the hybrid model 208 utilizes web scraping techniques to target and extract structured information related to product attributes such as dimensions, specifications, features, and prices. By analyzing the HTML structure and applying pattern recognition algorithms, the model accurately captures attribute-value pairs from web pages in a structured format.

In an exemplary embodiment, the one or more values for attribute mapping are fetched from various data formats such as, but not limited to, structured data format, text data format, image data format, video data format, and audio data format.

In accordance with the exemplary embodiment, the hybrid model 208 processes different data formats using specialized techniques for each. For structured data, the model begins by normalizing and parsing the text, followed by applying rule-based methods for field extraction. It then utilizes Named Entity Recognition (NER) for mapping entities and employs Large Language Models (LLMs) to provide contextual insights and generate any missing content.

When handling text data, the model applies pattern matching and text parsing techniques, alongside NER for entity extraction. LLMs are then leveraged to extract inferential attributes and generate missing content, ensuring comprehensive text analysis.

For image data, the hybrid model 208 normalizes and extracts relevant features from any associated text. It applies metadata rules and template matching to integrate Optical Character Recognition (OCR) with NER, and uses multimodal LLMs for processing that combines both vision and language.

In processing video data, the model extracts frames and processes the accompanying text and audio tracks. It utilizes scene detection rules and temporal analysis, applies OCR and NER to the video frames, and employs LLMs to summarize and map any relevant missing attribute values.

Finally, for audio data, the model normalizes and segments the text, applying keyword spotting and pattern detection. It transcribes the audio, utilizes NER for entity extraction, and employs LLMs for contextual analysis, classification, and the generation of missing content.

In one or more embodiments, by integrating web crawling and web scraping techniques, the hybrid model 208 ensures robust and thorough extraction of one or more attributes and the one or more corresponding values across a wide range of online sources. This approach enhances the hybrid model's 208 capability to gather comprehensive and up-to-date product information, regardless of variations in website layouts or data presentation styles.

In some non-limiting embodiments, the product catalogue creator 104 may initiate all three models (rule-based, NER, Gen-AI) depending on the factors and characteristics related to the received data.

In accordance with the same, the outputs that are produced from each of the models are combined to generate a final taxonomy. The rule-based model ensures accuracy where rules apply, the NER model handles ambiguous or unstructured data effectively, and the Gen-AI model enhances completeness and coherence of the final taxonomy. By integrating the outputs from all the three models, the product catalogue creator 104 constructs a consolidated taxonomy. The taxonomy categorizes and organizes the extracted product attributes, values, and relationships in a structured and meaningful manner.

The attribute-value module 210 may comprise suitable logic, interfaces, and/or code that may be configured to generate one or more attribute-value pairs using a rule-based model, Named Entity Recognition (NER), and a Generative AI (Gen-AI) model. These pairs are then normalized and mapped to a predefined product taxonomy and product catalog template to create a final taxonomy.

In some non-limiting embodiments, the final taxonomy is saved in a structured format and is made accessible via one or more APIs. Additionally, the saved taxonomy can be downloaded in various formats or integrated with e-commerce and/or marketplace platforms.

After generating the one or more attribute-value pairs, the attribute-value module 210 maps these pairs to the corresponding product. Mapping the one or more attribute-value pairs involves associating each attribute-value pair with the specific product to which it applies. This linkage ensures that the attributes and their values are accurately represented for each product.

In one or more embodiments, the attribute-value module 210 maps the one or more attribute-value pairs to the product by identifying individual products, associating relevant attribute-value pairs, validating accuracy and relevancy of the association, integrating the mapped attribute-value pairs into product catalogues or databases.

For instance, the attribute-value module 210 first identifies and categorizes individual products within the dataset or inventory. Each product is assigned a unique identifier or key that facilitates efficient data management and retrieval. For each product identified, the attribute-value module 210 associates relevant attribute-value pairs extracted earlier in the process. This association is based on matching criteria such as product identifiers, SKU (Stock Keeping Unit) numbers, or other unique product identifiers. During the mapping process, the attribute-value module 210 validates the accuracy and relevance of attribute-value pairs assigned to each product. This involves cross-referencing extracted attributes with product specifications or databases to ensure consistency and completeness. Mapped attribute-value pairs are integrated into product catalogues or databases, enhancing the organization and accessibility of product information.

In one or more embodiments, the attribute-value extraction and mapping process is evaluated using a robust evaluation method with following metrics:

1. True Positives (TP): Number of correctly identified attribute-value pairs.
2. True Negatives (TN): Number of attribute-value pairs identified by the model but not present in the ground truth.
3. False Positives (FP): Number of incorrectly identified attribute-value pairs.
4. False Negatives (FN): Number of attribute-value pairs not identified by the model but present in the ground truth.

Accuracy: The ratio of correctly predicted attribute-value pairs to the total number of attribute-value pairs in the dataset.

$$\text{Accuracy} = \frac{TP + TN}{TP + TN + FP + FN}$$

The attribute-value pairs are organized and stored in a structured format within the system. The structured format typically adheres to a predefined schema or database structure that facilitates efficient storage, retrieval, and management of product information. Examples of structured formats could include relational database tables, JSON objects, XML files, or other data storage formats optimized for organizing product data.

In some non-limiting embodiments, the attribute-value module 210 is configured to be adjusted or customized based on specific requirements or business rules. It adapts to different product categories, industries, or markets by accommodating varying attribute types, languages, or localization needs.

The catalogue creation module 212 may comprise suitable logic, interfaces, and/or code that may be configured to create a product catalogue using the one or more attribute-value pairs.

The primary input for the catalogue creation module 212 is one or more attribute-value pairs. Attribute-value pairs consist of product characteristics (attributes) and their corresponding values, which define the features, specifications, and details of each product. The main function of the catalogue creation module 212 is to compile and structure product information into a comprehensive catalogue format. It organizes and presents product data systematically, ensuring that each product is accurately represented with its attributes, values, descriptions, and other relevant information.

In one or more embodiments, a product catalogue is further customized using automated data validation check and feedback loops to adapt the product catalogue to different platform-specific formats, templates, mapping tools, requirements, and guidelines.

Following the initial creation phase, automated data validation checks are employed to ensure the accuracy, completeness, and consistency of the product catalogue data. These checks verify that all extracted attributes and their corresponding values meet predefined standards and adhere to specified formatting guidelines. Any discrepancies or errors identified during this validation process are flagged for review and correction. Feedback loops are integral to the customization process, enabling continuous refinement and adaptation of the product catalogue. User feedback, system-generated analytics, and performance metrics are systematically analyzed to identify areas for enhancement. This iterative approach allows for ongoing optimization of attribute extraction algorithms, improvement of data quality, and alignment with evolving platform-specific requirements.

The product catalogue is dynamically adapted to suit the distinct formats and templates mandated by various e-commerce platforms or digital marketplaces. This includes adjusting attribute naming conventions, data structure, and presentation styles to ensure seamless integration and compatibility. By adhering to platform-specific guidelines, the customized catalogue enhances visibility, searchability, and user engagement across different online channels. Integration with mapping tools facilitates efficient synchronization of attribute-value pairs with external databases or systems used for inventory management, order fulfillment, and customer relationship management. This integration ensures that product data remains synchronized and up to date across multiple platforms, minimizing discrepancies and optimizing operational efficiency.

An exemplary demonstration on how to define rules and expressions using rule-based model for extracting attributes like brand, color, and size from product descriptions in English, French, and German, is shown here:

English:
Brand: brand:\s*(\w+)
Color: color:\s*(\w+)
Size: size:\s*(\d+\s*\w+)

French:
Brand: marque:\s*(\w+)
Color: couleur:\s*(\w+)
Size: taille:\s*(\d+\s*\w+)

German:
Brand: marke:\s*(\w+)
Color: farbe:\s*(\w+)
Size: größe:\s*(\d+\s*\w+)

The demonstrated rules and expressions represent the rule-based model as a set of logical functions fi that take product information extracted from product manuals and product descriptions di as input and output an attribute-value pair (aj, vk):

$$f_i(d_i) = (a_j, v_k)$$

Map the extracted attribute-value pair to a predefined product catalog template as an outcome of the rule-based model inference.

An exemplary demonstration on how to create attribute-value mapping using the NER model is shown here:

Collect product descriptions from international versions of e-commerce sites and various product manuals in different languages.

Annotate the collected data with entity labels for the product attributes to extract (e.g., product_type, size, fit size, material, color).

Example for Annotation:

For a product description like "T-shirt XL Slimfit Cotton, White":

"T-shirt" would be tagged as product_type
"XL" as size
"Slimfit" as fit_size
"Cotton" as material
"White" as color a. Tokenization and Embeddings:

Tokenize the product data and represent them as word embeddings. Let $W=\{w_1, w_2, w_3, \ldots w_i\}$ be the set of tokens in a product description $d_i$. Each token $w_i$ is represented as a word embedding vector $e_i$.

Use a tokenizer XLM-RoBERTa that supports multiple languages.

Encode labels for NER tasks using a consistent scheme across all languages, such as the BIO (Begin, Inside, Outside) tagging scheme.

b. NER Model Training:

The values are extracted for the relevant attributes from different marketing materials and documents related to the products.

Train a deep learning architecture-Transformers for sequence labeling tasks as NER on the labeled and annotated data to create an entity-label map based on product information.

Use NLP technique-Named Entity Recognition (NER), dependency parsing, and entity linking techniques to identify and normalize attribute values.

c. NER Model Output:

The output of the NER model is a sequence of labels $Y=\{y_1, y_2, y_3, \ldots y_i\}$, where each label $y_i$ represents the named entity.

Each label $y_i$ corresponds to a token $w_i$ in the input product description $d_i$.

The set of names entities extracted from $d_i$ is demoted as $NE=\{(s_1, e_1, a_1), \{(s_2, e_2, a_2), \{(s_3, e_3, a_3), \ldots \{(s_p, e_p, a_p)\}$, where $s_j$ and $e_j$ represent the start and end positions of the named entity, and $a_j$ represents the attribute associated with the named entity.

d. Probabilistic Mapping:

For each named entity ($s_j$, $e_j$, $a_j$) extracted from $d_i$, calculate the probability of it being a valid attribute-value pair.

Let $P(a_j|w(s_j:e_j), \Theta)$ represent the probability of the named entity ($s_j$, $e_j$, $a_j$) being a valid attribute-value pair for the given product description $d_i$ and the NER model parameters $\Theta$.

e. Attribute-Value Mapping:

Assign the each named entity ($s_j$, $e_j$, $a_j$) to the attribute $a_j$ with the highest probability: $a_i = \text{argmax}_{aj \varepsilon A} P(a_j|w(s_j:e_j), \Theta)$ Map the extracted attribute-value pair to a predefined product catalog template as an outcome of the NER model inference.

An exemplary demonstration on creating attribute-value mapping using the Generative AI (Gen-AI) model is outlined as follows:

Data Preparation: Begin by collecting product descriptions from various e-commerce platforms and regional websites in multiple languages.

Identification of Missing Attributes: Identify the missing attributes within these product descriptions and create a target dataset focused on these gaps. For instance, in a product description like "T-shirt, XL, Slimfit, Cotton Mix, [MISSING_COLOR]," the task is to provide the missing color attribute in various languages.

Model Training: Use a pre-trained multilingual model and fine-tune it on a customized product dataset. The fine-tuning process involves training the model on a dataset where the input is the existing product information, and the output is the missing attribute value. This could include generating content for attributes such as product features or product overviews.

Generation of Attribute-Value Pairs: Employ the generative model to capture the contextual understanding of the product descriptions and other relevant materials, and use this understanding to generate the missing attribute-value pairs directly.

Evaluation Using Automated Metrics: Measure the overlap of n-grams, which is particularly useful for evaluating longer and more complex attribute values, using the ROUGE-L (Recall-Oriented Understudy for Gisting Evaluation) metric.

Human Evaluation: Integrate human evaluation methods to validate the generated attributes for accuracy, relevance, and fluency. This step is crucial for capturing qualitative aspects that automated metrics may overlook.

In accordance with the aforementioned exemplary demonstrations, the hybrid model 208 approach combines the outputs from the rule-based model, NER model, and GenAI-LLM model to generate the attribute-value pairs. The model maps these extracted attributes and values to a predefined product taxonomy and product catalog template. It also resolves any ambiguities or inconsistencies in the mapping through validation and proofreading techniques, and optimizes the model based on feedback from domain experts.

Figure 3:
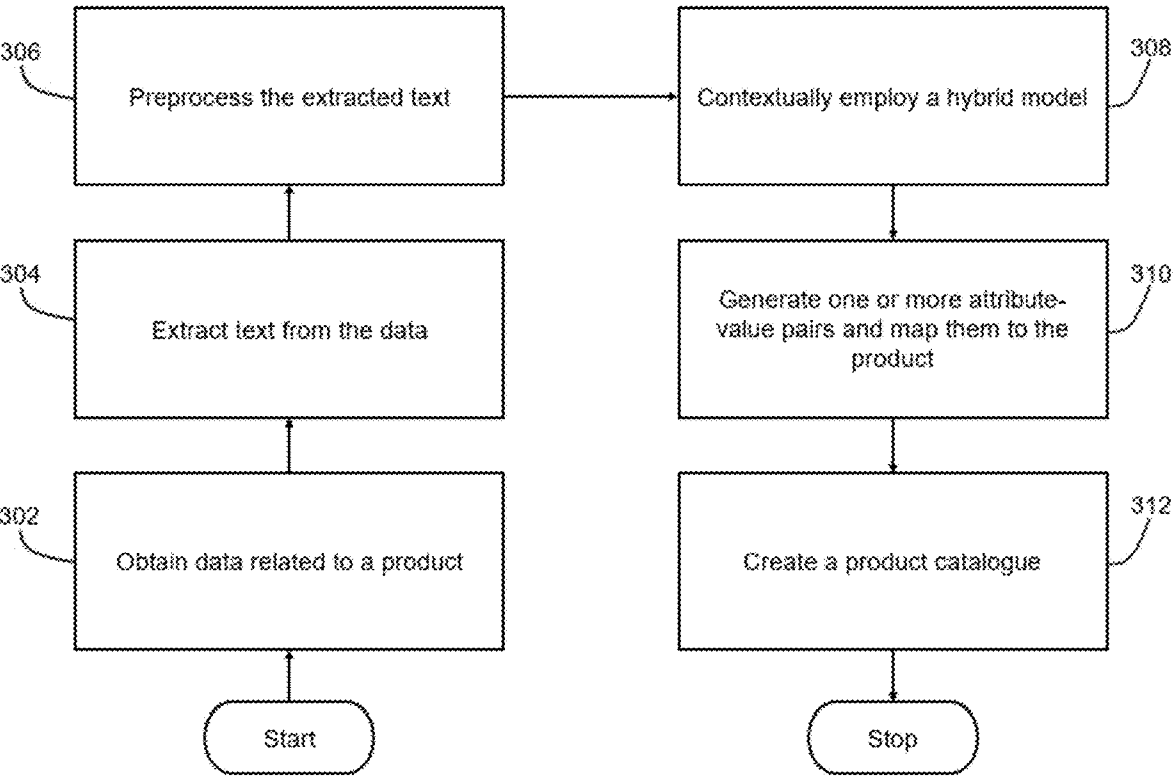
FIG. 3 is a diagram that illustrates a flow diagram for a method for creating a multimodal and multilingual product catalogue using a hybrid model, in accordance with an embodiment of the disclosure.

FIG. 3 is a diagram that illustrates a flow chart 300 for a method for creating a multimodal and multilingual product catalogue using the hybrid model 208, in accordance with an embodiment of the disclosure.

At 302, data related to a product is obtained using the data receiving module 202.

In one or more embodiments, the data reception module 202 is configured to receive data related to products from the one or more data sources 108 that may include unstructured data and semi-structured data. For example, unstructured data refers to information that does not have a predefined format or structure, such as, for example, free-form text, emails, and social media posts. Semi-structured data, on the other hand, has some organizational properties that make it easier to analyze, but does not fit neatly into a traditional relational database schema. Examples may include XML files, JSON documents, and certain types of log files.

In one or more embodiments, the data reception module 202 may use one or more APIs to gather product information from the one or more data sources 108 such as, for example, from product information management (PIM) systems. The one or more APIs serve as a bridge between the data reception module 202 and the one or more data sources 108, facilitating seamless communication and data exchange.

When the data reception module 202 is configured to interact with a data source from the one or more data source 108 via an API, it sends requests to the API endpoints provided by that source. The requests can be tailored to retrieve specific types of product information, such as details about product specifications, pricing, availability, and reviews. APIs typically offer various methods, such as GET, POST, PUT, and DELETE, to perform different operations and retrieve or manipulate data.

In one or more embodiments, the data reception module 202 receives data from the one or more data sources 108 with different modalities and different orientations such as, for example, text, images, videos, audios, etc.

At 304, text is extracted from the data related to the product using the extraction module 204.

In one or more embodiments, the extraction module 204 extracts text from the data related to the product. In some implementations, the extraction module 204 may use techniques such as, text parsing, optical character recognition (OCR), natural language extraction for extraction of text from the data received by the data reception module 202.

At 306, the extracted text is preprocessed using the preprocessing module 206. In one or more embodiments, the preprocessing module 206 cleans and preprocesses the extracted text by removing noise, special characters, and HTML tags. Cleaning the text involves removing unwanted or irrelevant parts of that could interfere with analysis or processing, which often includes removing noise, removing special characters, and removing HTML tags. Noise in the extracted text may refer to irrelevant or meaningless data, such as random characters, symbols, or artifacts from the extraction process that are not part of the actual text content. Special characters may refer to punctuation marks, mathematical symbols, or other non-alphanumeric characters that may not contribute to the analysis or could disrupt processing algorithms.

In some non-limiting embodiments, if the text extracted by the extraction module 204 is from web pages or HTML documents, it may contain HTML tags (e.g., <div>, <p>, <a>) which are not part of the textual content itself. Removing these tags ensures that only the plain text is considered for further analysis.

At 308, the hybrid model 208 is contextually employed based on the type of the data that is received.

In one or more embodiments, the hybrid model 208 of the product catalogue generator 104 is built by combining the rule-based model, the NER model, and the Gen-AI model. The hybrid model 208 is contextually employed based on the type of data that is received by the data reception module 202. Based on the type of data that is determined, the product catalogue creator 104 deploys a suitable model from the rule-based, NER, and Gen-AI models of the hybrid model 208.

In an exemplary embodiment, the choice of which model to employed from the hybrid model 208 depends on the characteristics and requirements of the received data.

In accordance with the exemplary embodiment, if the data can be effectively categorized and processed using predefined rules and conditions, the rule-based model is deployed to extract one or more attributes and one or more values from the text of the product data. The rule-based model of the hybrid model 208 is designed by using domain specific rules and patterns, and is configured to extract the one or more attributes and the one or more values based on known structures and patterns in the text data.

In accordance with the exemplary embodiment, if the data received is determined to be unstructured and semi-structured data, the NER model is deployed to identify and extract the one or more attributes and the one or more values of the product. The NER model is a type of natural language processing (NLP) model that identifies and categorizes entities within text data. Text data that lacks a predefined format or organization, such as product descriptions from various sources like customer reviews or social media comments is determined to be unstructured data. Data that has some organization but may not fit neatly into a relational database format, such as data from spreadsheets or loosely structured data tables is determined to be semi-structured data. The NER model processes the textual data to identify product names, extract product attributes, and capture attribute values.

In accordance with the exemplary embodiment, if a portion of content is determined to be missing in the received text, the Gen-AI model is deployed to generate new content, or responses based on patterns and examples seen during training.

At 310, one or more attribute-value pairs are generated using the attribute-value module 210, and mapped to the product in a structured format.

The attribute-value module 210 generates one or more attribute-value pairs and mapping the one or more attribute-value pairs to the product in a structured format.

After generating attribute-value pairs, the attribute-value module 210 maps these pairs to the corresponding product. Mapping the attribute-value pairs involve associating each attribute-value pair with the specific product to which it applies. This linkage ensures that the attributes and their values are accurately represented for each product.

Finally, at 312, a product catalogue is created using the one or more attribute-value pairs, by the catalogue creation module 212.

The catalogue creation module 212 creates a product catalogue using the one or more attribute-value pairs.

The primary input for the catalogue creation module 212 is one or more attribute-value pairs. Attribute-value pairs consist of product characteristics (attributes) and their corresponding values, which define the features, specifications, and details of each product. The main function of the catalogue creation module 212 is to compile and structure product information into a comprehensive catalogue format. It organizes and presents product data systematically, ensuring that each product is accurately represented with its attributes, values, descriptions, and other relevant information.

The method and system described herein offer distinct advantages over prior art by integrating three key methodologies: rule-based techniques, deep learning-based Named Entity Recognition (NER), and the utilization of Large Language Models (GenAI-LLM). This integrated approach provides a flexible and robust solution for precise extraction and mapping of product attributes to their corresponding values, specifically tailored to address the intricate challenges posed by multilingual content in e-commerce data.

The integration of rule-based model, NER, and GenAI represents a significant technical advancement, offering better adaptability and flexibility. This approach effectively handles multi-model data, support multi-lingual capabilities, and delivers overall improved performance compared to traditional methods that focus on singular or less comprehensive methodologies.

By combining rule-based approaches, NER, and GenAI-LLM, the system ensures more comprehensive, consistent, and accurate extraction of product attributes and values from the diverse data formats encountered on the web.

Another advantage of the method and system is that by integrating these methodologies, the method and system can effectively handle the complexities of multiple languages present in e-commerce data. This capability is crucial for global businesses operating in multilingual markets, facilitating consistent and accurate product representation across different linguistic contexts.

Yet another advantage of the method and system is that this approach is scalable, capable of processing large volumes of data and adapting to evolving patterns and trends in product attribute extraction. It supports continuous learning and optimization, ensuring robust performance in dynamic e-commerce environments.

Additionally, the method and system also offer a significant reduction in extraction time per product catalog by implementing this hybrid model approach. Compared to traditional methods that rely solely on manual or rule-based processes, the integration of NER and GenAI-LLM significantly reduces the time required to parse and interpret unstructured data sources, leading to a substantial efficiency improvement.

A significant advantage of the method and system is the automation of attribute extraction and mapping using the hybrid model approach. E-commerce platforms can utilize these comprehensive and up-to-date product catalogs to enhance the user experience, ultimately leading to increased product sales.

Those skilled in the art will realize that the above-recognized advantages and other advantages described herein are merely exemplary and are not meant to be a complete rendering of all of the advantages of the various embodiments of the present disclosure.

In the foregoing complete specification, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense. All such modifications are intended to be included within the scope of the present disclosure.

What is claimed is:

1. A method for creating a product catalogue, the method comprising:

obtaining, by a computer system, data related to a product;

extracting, by the computer system, text from the data related to the product;

preprocessing the extracted text;

contextually employing, by the computer system, a hybrid model based on a type of the data, wherein the hybrid model is an integration of a rule-based model, a Named Entity Recognition (NER) model, and a Generative-AI (Gen-AI) model, wherein the hybrid model is configured to:

extract, using the rule-based model, one or more first attributes and one or more values from the data based related to the product based on predefined structures, patterns, and regular expressions in text data;

extract, using the NER model, one or more second attributes and one or more corresponding values from unstructured or semi-structured text data related to the product, wherein the NER model tokenizes the text data using a tokenizer that supports multiple languages and represents tokens as word embedding vectors, and encodes entity labels for product attributes using a tagging scheme consistently across the multiple languages to identify and categorize named entities within the text data;

generate, using the Gen-AI model, new or missing context-dependent values for one or more third attributes based on descriptions of the data related to the product;

generating one or more attribute-value pairs and mapping the one or more attribute-value pairs to the product in a structured format;

creating the product catalogue using the one or more attribute-value pairs; and combining outputs from the rule-based model, the NER model, and the Gen-AI model to generate a final taxonomy corresponding to the product catalogue, wherein the one or more attribute-value pairs are normalized and mapped to a predefined product taxonomy and product catalog template to create the final taxonomy, and wherein the final taxonomy is saved in a machine-readable format and made accessible via one or more application programming interfaces (APIs) for integration with online platforms.

2. The method as claimed in claim 1, wherein the data related to the product is from at least one of a product title, a product specification, a product documentation, and a website of a manufacturer.

3. The method as claimed in claim 1, wherein the hybrid model enables extracting a plurality of attributes from different modalities of the data related to the product, and the different modalities include, but are not limited to, text, images, videos, and audios.

4. The method as claimed in claim 3, wherein extracting the plurality of attributes is performed using automated web scraping and crawling techniques.

5. The method as claimed in claim 1, wherein the product attributes include at least one of a product material, a product composition, a product form, a product value, a product utility, or function.

6. The method as claimed in claim 1, wherein the rule-based model is an adaptive model that dynamically updates rules based on user feedback and new data.

7. The method as claimed in claim 1, wherein the product catalogue is further customized using automated data validation check and feedback loops to adapt the product catalogue to different platform-specific formats, templates, mapping tools, requirements, and guidelines.

8. The method as claimed in claim 1, wherein the product catalogue is a multimodal and multilingual product catalogue.

9. The method as claimed in claim 1, further comprising converting the preprocessed text into numerical vectors using Term Frequency-Inverse Document Frequency (TF-IDF), wherein Term Frequency (TF) measures how frequently a term appears in a document calculated as a ratio of a number of times the term appears in the document compared to a total number of words in the document, and wherein Inverse Document Frequency (IDF) measures importance of the term across an entire corpus by calculating a logarithm of a ratio of a total number of documents to a number of documents containing the term, wherein the hybrid model receives and processes the numerical vectors.

10. A product catalogue creator for creating a product catalogue, product catalogue creator comprising:

at least one processor configured to:

obtain data related to a product;

extract text from the data related to the product;

preprocess the extracted text;

employ a hybrid model, wherein the hybrid model is an integration of a rule-based model, a Named Entity Recognition (NER) model, and a Generative-AI (Gen-AI) model, wherein the hybrid model is configured to:

extract, using the rule-based model, one or more first attributes and one or more values from the data based related to the product based on predefined structures, patterns, and regular expressions in text data;

extract, using the NER model, one or more second attributes and one or more corresponding values from unstructured or semi-structured text data related to the product, wherein the NER model tokenizes the text data using a tokenizer that supports multiple languages and represents tokens as word embedding vectors, and encodes entity labels for product attributes using a tagging scheme consistently across the multiple languages to identify and categorize named entities within the text data;

generate, using the Gen-AI mode, new or missing context-dependent values for one or more third attributes based on descriptions of the data related to the product;

generate one or more attribute-value pairs and map the one or more attribute-value pairs to the product in a structured format;

create the product catalogue using the one or more attribute-value pairs; and combine outputs from the rule-based model, the NER model, and the Gen-AI model to generate a final taxonomy corresponding to the product catalogue, wherein the one or more attribute-value pairs are normalized and mapped to a predefined product taxonomy and product catalog template to create the final taxonomy, and wherein the final taxonomy is saved in a machine-readable format and made accessible via one or more application programming interfaces (APIs) for integration with online platforms.

11. The product catalogue creator as claimed in claim 10, wherein the hybrid model enables extracting a plurality of attributes from different modalities of the data related to the product, and the different modalities include, but are not limited to, text, images, videos, and audios.

12. The product catalogue creator as claimed in claim 11, wherein extracting the plurality of attributes is performed using automated web scraping and crawling techniques.

13. The product catalogue creator as claimed in claim 10, wherein the created product catalogue is further customized using automated data validation check and feedback loops to adapt the product catalogue to different platform-specific formats, templates, mapping tools, requirements, and guidelines.

* * * * *